United States Patent Office 3,313,904
Patented Apr. 11, 1967

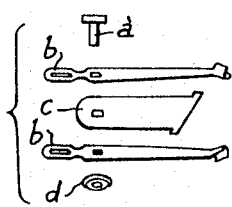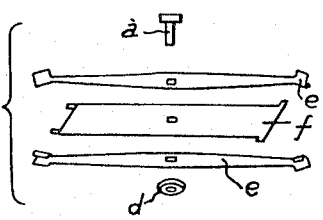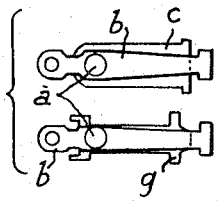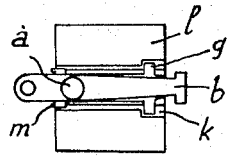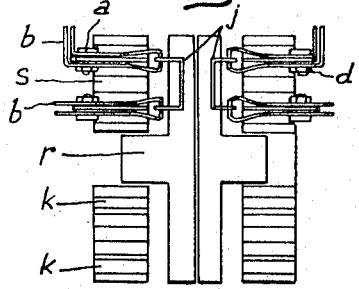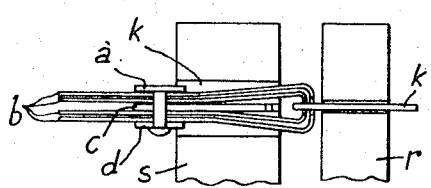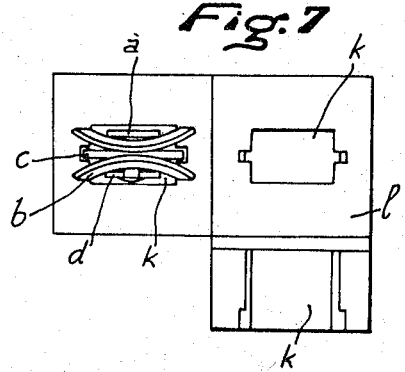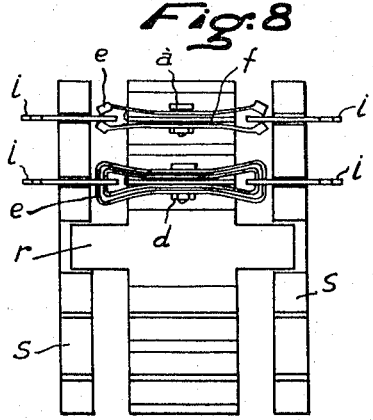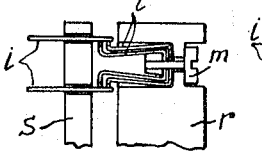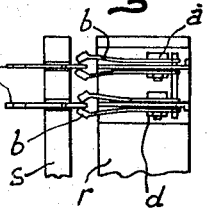

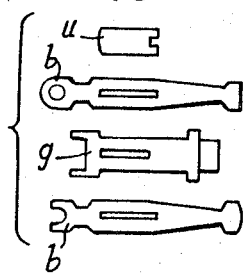
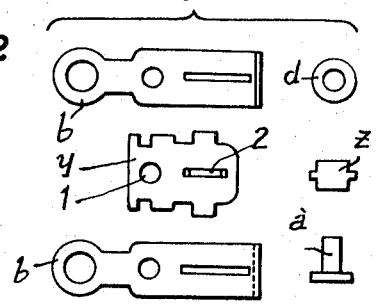
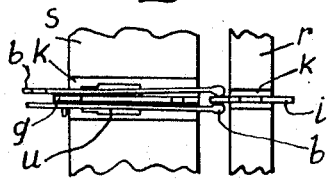
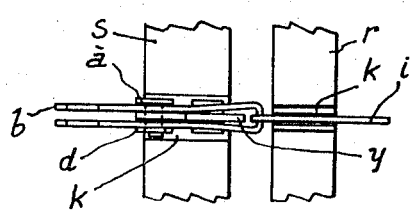
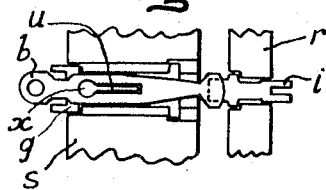
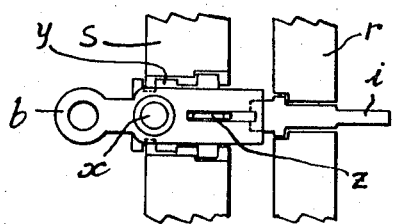
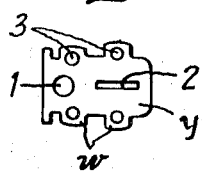
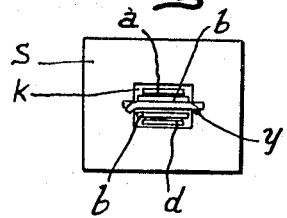

3,313,904
CONTACT SYSTEM
Henri L. Chambaut, 7 Rue Nationale a Villeneuve-Loubet, Alpes Maritimes, France
Filed Mar. 15, 1965, Ser. No. 439,788
Claims priority, application France, Mar. 14, 1964, 967,477
6 Claims. (Cl. 200—166)

The present invention relates to systems of premounted and preset multiple contacts and to related methods.

Among the objects of this invention is the provision of improved techniques resulting in improved contact structures capable of being used in switches of all kinds, in contactors and in all devices requiring precise, solid, independent contacts without any possibility of deviation and entirely dependable.

According to the invention, the minimum number of contacts for each system is two and the system may comprise four and many more contacts for each switching point.

Rotary switches arranged in accordance with the invention offer the advantage of being adapted to be used in all combinations of French switches, American switches or switches of other countries.

The present invention is designed to be used in radiophony, electronics, electricity, telephony, aviation, marine, in the automobile industry, and in various other industries, as well as for all apparatus used for measuring, controlling and regulating.

A system of contacts according to one embodiment of the invention comprises a support plate adapted to receive on each face the desired number of contact blades or strips; said contact strips being oppositely mounted on the support plate by means of one or more rivets or screws or by soldering or by any other suitable means, so that said contact strips are firmly fixed on said support plate, the contacts being preset under pressure on mounting to operate as clamps.

Recesses provided to receive said system are in proportion to the dimension thereof and are provided with two grooves or slots having substantially the thickness of the support plate in order to receive same without play.

Advantageously, the inserting and locking of said system in its recess is very quick and easy to effect.

The invention will be more clearly comprehended from the following detailed description as illustrated by the accompanying drawing in which:

FIGS. 1 and 2 are exploded views of two embodiments of my invention.

FIG. 3 shows two modifications of my improved contact system in its assembled condition.

FIG. 4 shows a similar contact system fitted in an insulating frame.

FIG. 5 illustrates a rotary arrangement incorporating a number of my improved contact systems.

FIG. 6 illustrates a multiple contact system.

FIG. 7 illustrates the fitting of my improved contact piece in a recess.

FIG. 8 shows the fitting of a double contact system in a rotor.

FIGS. 9 and 10 show two modifications of a contact system fitted in a rotor.

FIGS. 19 to 22 illustrate a contact system including an auxiliary securing member.

FIGS. 23 to 25 illustrate a further modification of a contact system including an auxiliary securing member.

FIG. 26 shows a plate of a modified outline carrying the contact blades.

FIG. 27 illustrates a last modification of a contact system fitted in a recessed part.

FIGURE 1 shows a double contact system $b$.

FIGURE 2 shows a double contact system at each end of the aggregate of the two blades or strips $e$.

Figure 11:
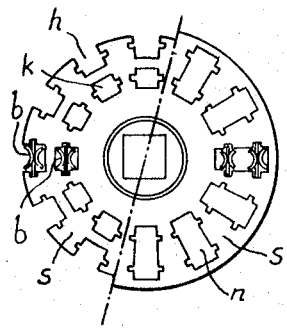
FIGS. 11, 12 and 13 illustrate different manners of fitting contact systems in stators adapted to cooperate with rotors.

FIGURE 3 shows respective double contact systems. The sytsem at the top of FIG. 3 is a model whose support $c$ extends over its entire length in its groove. The model at the bottom of FIG. 3 is designed for high-frequency circuits. Its support $c$ bears only against four lugs $g$, the greater portion of the system being unsupported, with the result that it creates only a minute capacity.

FIGURE 4 illustrates a double contact system mounted in a recess $k$ in an insulator frame $l$. Said recess is shown in FIG. 7. The support plate $g$ has its lugs on the side of the contacts withdrawn in the recess $k$, in order to increase the insulation with the adjacent contacts. The support plate is locked in its recess by small lugs $m$ raised to 90° relative to the support against the insulator $l$.

FIGURE 5 shows a double rotary switch having two stators $s$ and a double rotor $r$ provided over its entire circumference with any number of recesses $k$. Four double contact systems are oppositely mounted and act, on each side, on a circuit $j$ independently of each other. This type of switch provided with said contact systems is the one which permits the greatest possible number of combinations.

FIGURE 6 shows a quadruple contact provided with four contact strips $b$ mounted in the same recess $k$ and insuring the same combinations as FIG. 5. Moreover, this system is able to insure direct circuits, as does the one shown in FIG. 8.

FIGURE 7 gives two views of a contact $b$: A side view of closed contacts; a front view of a recess $k$ and in longitudinal direction.

FIGURE 8 shows a direct contact switch with double stator $s$ and a rotor $r$. At its upper portion it is provided with two double contact blades or strips $e$. At its lower or center portion it is provided with four strips forming double contacts $e$.

The operating dependability and flexibility are remarkable. The results in high-frequency switches are exceptional owing to the fact that the contacts $e$ as well as the contacts $i$ are fixed in the vented recesses $k$ of FIG. 7. Said fixed contacts $i$, in principle identical with the support plate $g$ of FIG. 4, are provided with four lugs which engage in the grooves of the recess $k$.

FIGURE 10 shows a double or quadruple contact $b$ system mounted in the rotor $r$. Said double or quadruple contact $b$ blades or strips can be connected to each other by wire or by soldering or by any other suitable means. The stationary contacts $i$ are fixed on the stator $s$.

FIGURE 9 shows a variant of the contacts of FIG. 10. Said double contact $l$ strips consist of a single U-shaped piece. They are mounted in a suitable recess and are fixed by screws and nuts, rivets, or by any other suitable fixing means.

Depending on whether a contact system is single, double, quadruple or so forth, the shape of its contact portion may be different or identical, depending on the available space and on each particular case. As a variant, the contact portion may be of other forms or shapes than those shown in the drawing; for example, it may be provided with holes or slots shaped so as to be adapted to receive riveted, crimped-on or soldered contacts.

In the case of systems of contacts which are very close to each other, the support plates *c* of FIG. 3, *g* of FIG. 4, and *f* of FIG. 8 may be provided with four lugs rising at a right angle in the direction of the contacts according to *m* of FIG. 4.

FIGURE 11 shows a stator *s* provided with contact strips *b*. This stator may have recesses *h* and *k* as shown on the left side or recesses *n* as shown on the right side.

Figure 12:
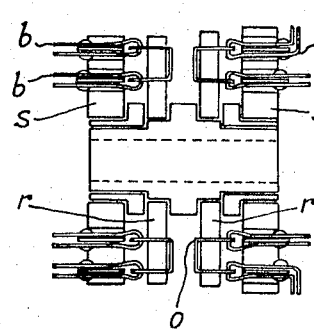
Figure 13:
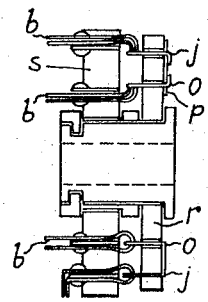

FIGURE 12 shows a double contact element, the stators *s* being provided with contacts *b*, the double rotor *r* being provided with distributing contacts *j*, and circuits *o* being connected to each other by the bars *p*.

Figure 14:
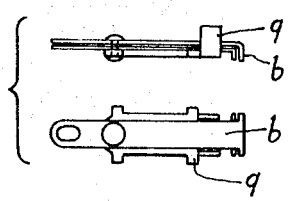
FIG. 14 illustrates in side and plan view a further modification of the contact system.

FIGURE 14 shows the strips of contacts *b* mounted and supported in the same direction.

Figure 15:
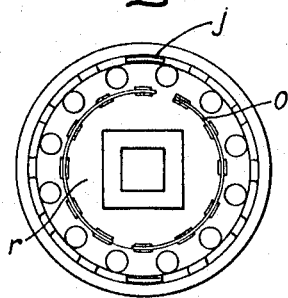
FIGS. 15 and 16 illustrate the distribution of contact systems on a rotor as seen from both sides.

FIGURE 15 shows a rotor *r* seen from the side of the stator *s*. Two distributing contact blades *j* are visible, as well as two circuits *o* of six positions.

Figure 16:
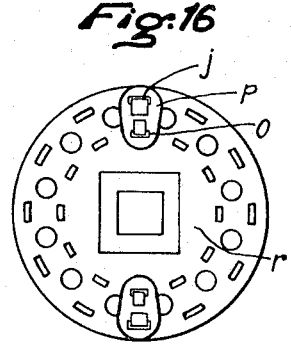

FIGURE 16 shows the reverse of FIG. 15, plate *p* short-circuiting elements *j* and *o*. The number of twelve positions is arbitrary, as this number may be substantially reduced or increased on the circumference.

Figure 18:
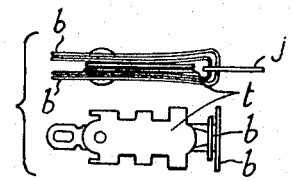
FIG. 18 illustrates a quadruple contact system.

FIGURE 18 shows an arrangement of strips of quadruple contacts *b*. Two of said blades are of normal width and are proportional to the fixed contact blade *j* on which they make contact. The two other blades *b* are definitely wider at the portion of the contacts. This arrangement serves the purpose of avoiding the destruction of the contacts of a switch passing current by using two wider strips charged with recuperating the sparks, consequently with neutralizing each other while the two other narrower contact blades *b* insure during said time perfect contacts.

The single or double contact blades *b* can be mounted on a support of one or more thicknesses *t* (FIG. 18) and may also offer the possibility of using the spring of said supports for being firmly fixed in each recess.

Figure 17:
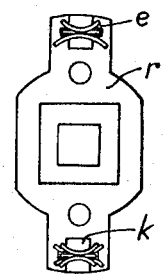
FIG. 17 illustrates multiple contact systems incorporated with a rotor.

FIGURE 17 shows at the lower portion of the drawing, a view of the quadruple contact *b* mentioned relative to FIG. 18. The upper portion of the drawing shows a double contact of the same principle.

An additional safety factor insuring perfect guiding of the contact blades *b* is obtained by a variant shown in FIGS. 19, 20, 21, 22. A flat piece *u* having a guide groove engages in the contact carrying plate *g* on the side of the contacts, and divides exactly the projecting portion of said piece *u* in the contact blades *b*.

The blades *b* being mounted on the plate *g*, the piece *u* is riveted on each blade *b* at the portion opposite the groove. Said riveting is indicated at *x* in FIG. 21.

FIGURE 22 shows the guide blade *v* destined for use in FIGS. 2 and 8.

FIGURES 23, 24 and 25 show another variant of fixing and accurately guiding the contact blades *b*. The guide plate *z* is seated or soldered on the support plate *y*. The contact blades *b* are then mounted on each side of the support plate *y*. The slots of the blades *b* engage the guide plate *z*. The contact blades *b* are connected to the support plate *y* by washer, rivet and seating shown at *x* in FIG. 25. It is also possible to use other means of assembly without departing from the scope of the invention.

These latter arrangements make it possible to improve, more particularly, the air insulation as well as the capacity, both for the contact systems *b* and for the circuit blades, and circuits *i* fixed in their aerated recesses *k*.

The connection of the contact blades *b* and *e* on the support plate or plates can be effected, as a variant, otherwise than by rivet, for example, by turned down lugs, suitable collars or flanges, by soldering, etc.

The embodiments of FIGS. 8, 9, 10 and 17 can be used only partially for the combinations of certain foreign switches.

FIGURE 26 shows a plate *y* for carrying contact blades *b*. It offers the advantage that it can be mounted without play in the recesses *k* having different contractions, as is the case with molded insulating pieces.

In order to obtain this result, the carrying or supporting flanges of plate *y* are slightly rounded as at *w*. Each flange or wing is perforated by a suitable hole 3, having a round, square or any other shape, or by a slot made in such a manner that, upon the introduction of the contact carrier *y* into its recess *k*, the material of the flanges or wings, indicated by *w* flattens when penetrating into the opening or hollowed space 3, thus adjusting accurately in the recess *k*.

FIGURE 27 shows a double contact, seen from the branching side with flat strips. Said strips or blades can be angled at 90°.

What is claimed is:

1. A contact system for cooperation with an external contact member constituted by a unit including an elongated carrier plate and at least one elongated contact blade of a predetermined elasticity, secured directly to each side of said carrier plate, extending along the latter and the two ends of which project longitudinally beyond the corresponding ends of the carrier plate and are bent towards the corresponding ends of the blade on the other side of the carrier plate, said cooperating blade ends being adapted to elastically hold between them the external contact member.

2. A contact system as claimed in claim 1, wherein equal numbers of contact blades are secured in superposition to each side of said carrier plate.

3. A contact system as claimed in claim 1, wherein equal numbers of contact blades are secured in superposition to each side of said carrier plate, the different blades on each side of the carrier plate being of different shapes and having rounded projecting ends.

4. In combination with a compact system as claimed in claim 1, the provision of a flat guiding member extending transversely through the carrier plate and the contact blades.

5. In combination with a contact system as claimed in claim 1, the provision of a guiding stud rigid with the carrier plate and extending through the contact blades.

6. In a switch, the combination of a stator, a rotor coaxially carried inside the stator, one of which parts, the rotor and the stator, is provided with flat elongated slots extending in parallelism with the rotor axis, a unit fitted inside each slot and including an elongated carrier plate and at least one elongated contact blade of a predetermined elasticity, secured directly to each side of said carrier plate, extending along the latter and at least one end of which projects longitudinally beyond the corresponding end of the carrier plate and is bent towards the corresponding end of the blade on the other side of the carrier plate, and at least one external contact member carried by the other of said parts and adapted to be elastically held between the contact blades fitted in any of the slots of said one part.

References Cited by the Examiner

UNITED STATES PATENTS

| | | | |
|---|---|---|---|
| 1,575,599 | 3/1926 | Hornberger | 200—104 |
| 1,678,508 | 7/1928 | Hart | 200—166 |
| 2,443,230 | 6/1948 | De Coursey | 200—166 |
| 2,591,684 | 4/1952 | Deakin | 200—166 |
| 2,647,974 | 8/1953 | Schleicher | 200—166 |
| 2,751,469 | 6/1956 | Torley et al. | 200—166 X |
| 2,967,216 | 1/1961 | Zablocki et al. | 200—166 X |
| 3,085,139 | 4/1963 | Wright | 200—166 |
| 3,126,466 | 3/1964 | Schwartz | 200—166 |
| 3,140,364 | 7/1964 | Swanke et al. | 200—166 X |
| 3,152,228 | 10/1964 | Broadhead | 200—11 |
| 3,209,110 | 9/1965 | Meyer | 200—166 |

ROBERT K. SCHAEFER, *Primary Examiner.*

H. O. JONES, *Assistant Examiner.*